Figure 6:
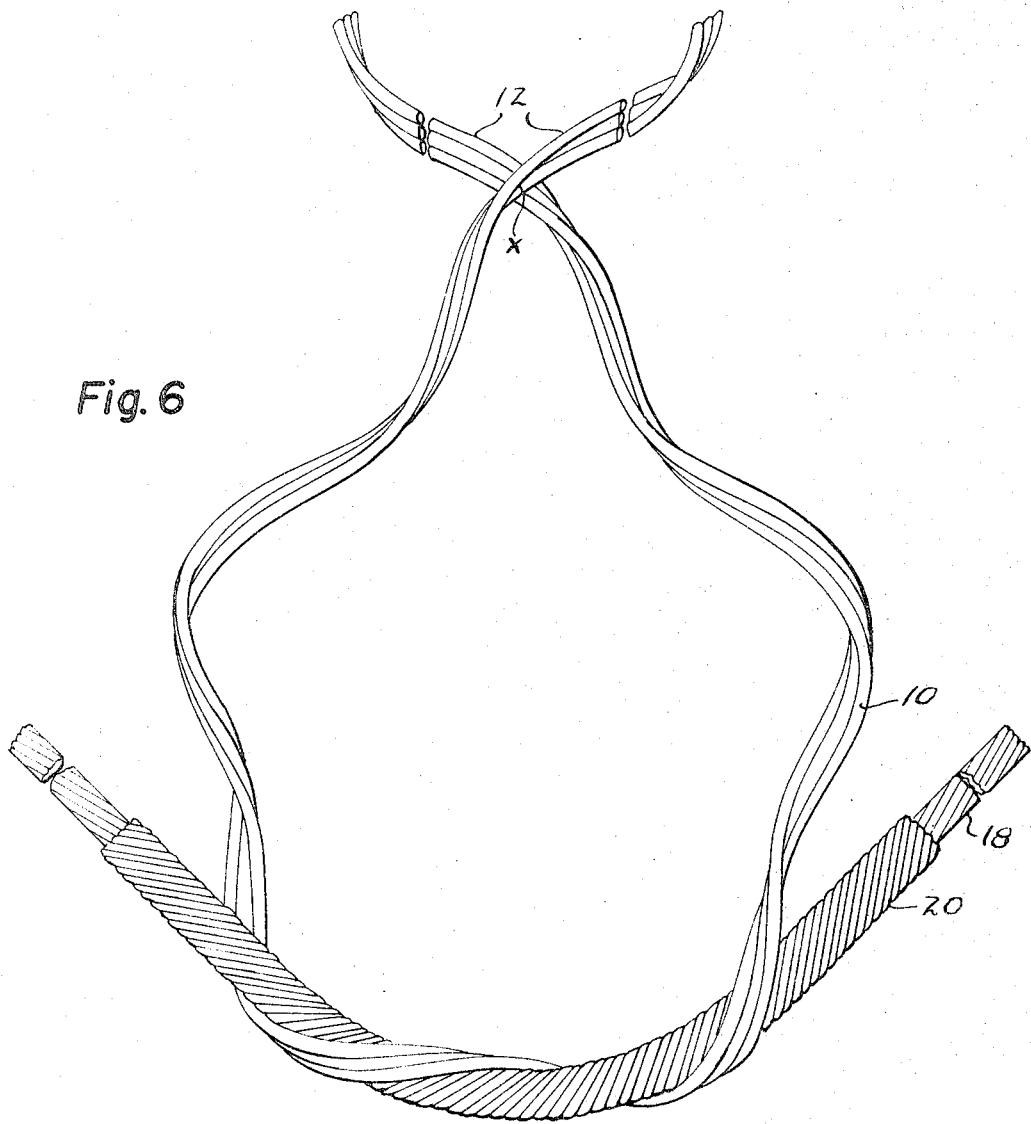

Oct. 17, 1967  R. L. REESE  3,347,980
TIE ARMOR SUSPENSION
Filed Feb. 1, 1966  2 Sheets-Sheet 1
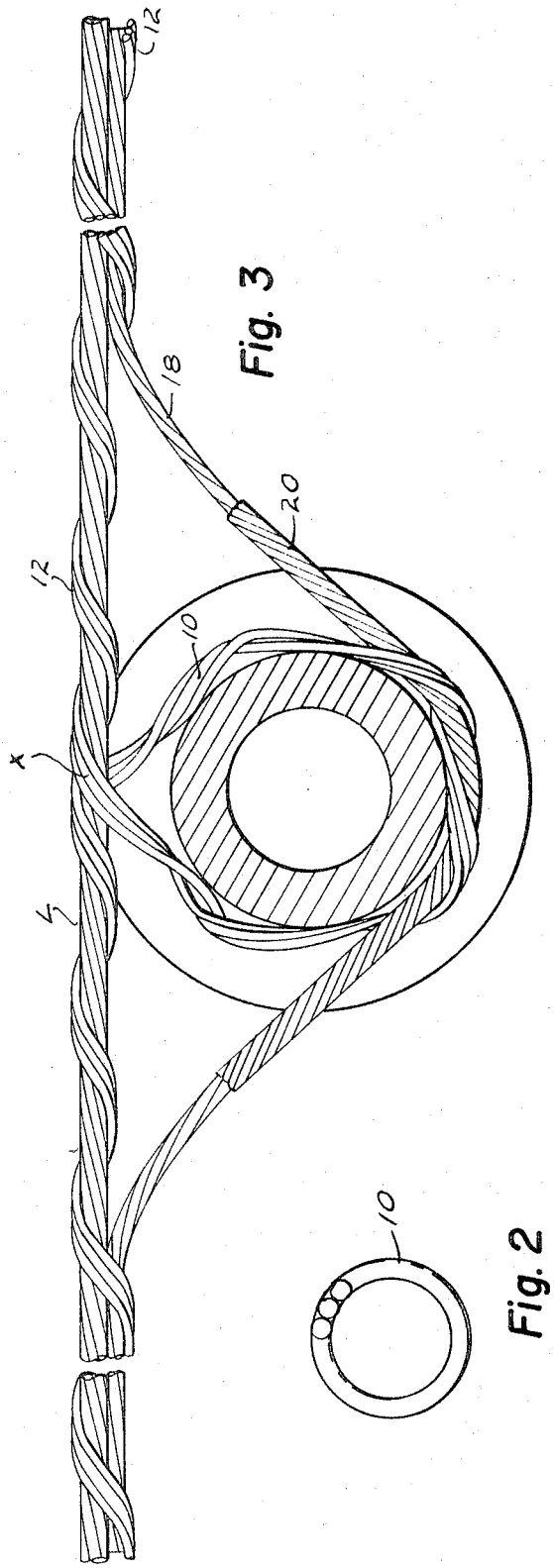
INVENTOR.
Robert L. Reese
BY J. N. Douglas
his atty INVENTOR.
Robert L. Reese United States Patent Office 3,347,980
Patented Oct. 17, 1967

3,347,980
TIE ARMOR SUSPENSION
Robert L. Reese, Rocky River, Ohio, assignor to The Fanner Manufacturing Company, a Division of Textron Inc., Cleveland, Ohio, a corporation of Rhode Island
Filed Feb. 1, 1966, Ser. No. 524,296
9 Claims. (Cl. 174—173)

This invention relates to apparatus for securing a line such as a power transmission or telephone line to a support. It is an improvement over the commonly assigned copending application Ser. No. 417,433, filed Dec. 10, 1964, now Patent No. 3,261,581, and Patents 2,947,504 and 3,042,745.

It is common practice to secure power transmission lines to a grooved support, which may be a sheave or an insulator of the pin or spool type, where the line is placed in the groove and then held in place by wrapping soft annealed wire around the line and insulator, or by clamps of various types such as saddle clamps. The above have required a considerable amount of skill on the part of the workman and had the disadvantage that the line could "pull through," that is, slide relative to the insulator, particularly where the span of the line was long. In time these ties became loosened. In the case of clamps, damage to the line frequently occurred.

Recently there has come into use various types of preformed line ties which, to a large extent, overcome the disadvantage of the earlier art. Although these ties were to a certain extent satisfactory, they still suffered from the disadvantage that they were subject to "pull through." "Pull through" is the movement of the line, when greater strain is applied to the line at one side of the support, longitudinally through the tie and relative to the support. Patent 2,947,504 was directed along the lines of curing this defect but had the disadvantage that it was difficult to install and expensive to manufacture. It had the additional defect that where the line was engaged on opposite sides of the support the elements formed a "full lay" around the line. A "full lay" is that number of wires where complete coverage of the line is attained or where another of the helical wires cannot be inserted in the combination around the line. Such devices are applied to the line during the installation and when the desired tension is placed on the line that tension causes the line to shrink slightly with the result that the "full lay" coverage no longer engages the line as tightly as was originally contemplated. The above defect was particularly pronounced when the lines were long spans, as where they cross a highway or a river.

Should the line break, a completely one-sided strain is placed on the tie, and, ties such as that of Patent 3,042,745 could unwrap from the support and allow the remaining or unbroken part, as well as the broken part, to fall.

In many instances, except the aforesaid invention of the copending application and Patent 3,127,140 the line was held in close contact with the insulator and the vibrations of the line caused the line to hammer at the points of contact with the insulator or to bend on opposite sides of that contact. Hammering caused a work hardening which eventually resulted in failure. Bending also caused hardening and eventual failure.

The present invention contemplates a line tie and armoring suspension which overcomes the above noted defects. Among the more important features may be included the facts that the improved tie of the invention is much more economical to manufacture; can be installed by workmen with a minimum degree of skill; has an improved holding power with the line and eliminates pull through; provides armoring for the line at point of contact with the insulator; prevents hammering and bending of the line at the insulator, and has improved vibration dampening characteristics.

Still other advantages of the invention and the invention itself will become more apparent from the following description of some embodiments thereof which are illustrated by the accompanying drawings and form a part of this specification.

Figure 5:
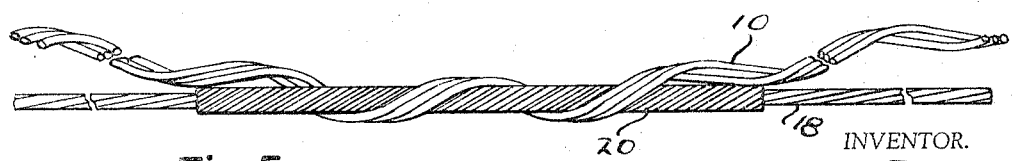

In the drawings:
FIG. 1 is a broken elevational view of a preformed element used in making the tie of the invention;
FIG. 2 is an end view thereof;
FIG. 3 is a broken elevational view of the tie as associated with a spool-type insulator;
FIG. 4 is a broken view of a secondary element used in conjunction with the element of 3;
FIG. 5 is a broken view of the device in an intermediate stage of formation; and
FIG. 6 is a broken view of the device assembled and prior to its installation.

Briefly, the invention contemplates a primary helical element formed to provide a bight for engagement with a support and a pair of legs for engagement with the line together with a secondary element, which may be a piece of strand, threaded through the helices of the bight portion at its apex and having portions extending outwardly from the bight to the line and being held in engagement with the line by the legs of the main element which are wrapped around the line and the secondary element.

More specifically, the primary helical element is formed of hard drawn resilient wire into open helical form having an inside diameter that is less than that of the line to which it is applied, with a pitch that may be slightly less than that of the line. The resiliency of the element is such that it may be applied to the line from its side without permanent deformation. Although a single wire element may be used, it is contemplated that the usage will include two or more such elements which are interthreaded with each other to provide a laminated helical ribbon. The invention will be described in conjunction with the use of three elements.

The first step in the construction of the device, when more than one single element is used, consists in assembling a series of the elements, by interthreading the elements with each other, in such a manner that the resultant primary element partakes of a ribbon-like formation of elements 10, as shown in FIGS. 1 and 2. The elements so assembled may be sprayed with an adhesive to hold them in position relative to each other. In addition, the inner surfaces of the helices may be provided with an abrasive to increase their holding power, as is well known in the art.

A secondary element is provided which may be a piece of strand or cable. The strand or cable usually is comprised of a plurality of wires twisted about a center core. There maybe three, seven or more wires, depending on the size of the strand and the size of the convolutions of the helices in the primary element.

In one of the preferred froms the secondary element consists of a piece of strand 18 having a bight engaging portion which is enlarged by covering the strand with a plurality of armor rods 20. This provides an enlarged and stiffened primary element engaging portion and a reduced size and more flexible line portions.

Although it is contemplated that the secondary element be made of resilient hard drawn wire, it is also contemplated that the element could be made of annealed or soft wire should it be desired. In addition, the enlargement 20 could be a sleeve of plastic or soft metal and the parts 18 extending from the sleeve of the armoring be of either hard drawn or soft metal. The secondary element could also be made of plastic, such as fiber glass reinforced plastic.

The next step in the assembly comprises assembling the primary and secondary elements with each other at the point which is later to become the apex of the bight. This is done by wrapping the mid-portion of the primary element around the enlarged part 20 of the secondary element as illustrated in FIG. 5, holding the two elements tightly together. The primary element, as previously stated has sufficient flexibility that it may be applied to the secondary element without premanently deforming either element. As best shown in FIG. 5, the engagement is substantially for one complete pitch length. The amount of engagement is determined by the pitch length of the helices of the primary element and the size of the bight. It can be more or less than one pitch length.

In the preferred construction the wires of the primary element may be larger and stiffer than those of the secondary element, although in the broader aspects of the invention the wires may be the same size in both elements.

The assembly, as shown in FIG. 5, is then bent to the form shown in FIG. 6, wherein the primary element is bent to form a bight having a pair of legs 12 which cross over and then diverge from each other in opposite directions. The bight so formed is designed to be substantially the same size, or slightly smaller, than the diameter of the support to which the device is to be atached after it is attached. Usually such a device is used in conjunction with a support, which may be an insulator or sheave having a circumferential groove. It is also common for such supports to be disposed with their axes parallel to the ground or horizontal. The bight before application has an inner diameter slightly larger than the diameter of the support at the bottom of the groove and during attachment some closing occurs to cause the helical convolutions to securely engage with the support.

The primary element and its bight may have the same general conformation as described in the above mentioned copending application.

The unit assembled as shown in FIG. 6 is applied to the line and support as shown in FIG. 3. In this instance, the line L is laid in the top groove of the support. It should be observed that the manner of use being described is but one way it could be used and that the axis of the support could be vertical as well as horizontal and that the line could be below, above or on either side of the support. The unit of FIG. 6 is then placed with the bight extending around the support and with the secondary element on the far side from the line. The legs 12 which cross over at X, FIG. 6, are brought down to and wrapped around the line for a short distance. Then one of the extensions 18 of the secondary element is laid alongside the line and the leg wrapped around the line and the secondary element.

The legs 12 may be, and preferably are, long enough so they extend beyond the ends of the secondary element, the extremities being wrapped around the line alone. After one side is applied in this manner the other side is applied in a similar manner. The legs 12 of the primary element and the flexible parts 18 of the secondary element could be coextensive in length.

The device, when assembled, takes the appearance as shown in FIG. 3. The legs 12 of the primary element being wrapped first around the lines, extending in opposite directions from the support and then wrapped around the secondary element and line, and finally around the line alone. When so constructed, the secondary element acts as a reinforcement increasing the holding power of the tie. It also acts as a static shield because it provides a direct conductance from the apex of the bight to each side of the line. It also increases the resistance to "pull through" of the line as much or more than 100%.

The strength is also increased because there is substantially a strut formation on each side of the support due to the secondary element in combination with the primary element.

This structure also holds the opposite side against kicking up or partial rotation on the support due to vibrations from either side because there is a division of the load from the apex on one side to the base on the other side. Thus vibrations coming into the apex from either side are suppressed and have no effect on the support.

In addition to the above, it has improved damping qualities. Vibrations running from the line to the support are suppressed because of the resiliency of the secondary element which absorbs the vibrations. The structure provides a delta formation on each side of the support and vibrations from the line toward the support come in from the apex sides and are absorbed by the base on the other side.

Having thus described the invention in some embodiments thereof, I am aware that numerous and extensive departures may be made therefrom without departing from the spirit or scope of the invention as expressed in the claims.

I claim:
1. A tie and line suspension comprising a primary element and a secondary element, said secondary element having a central portion and resilient portions extending from opposite sides of said central portion for engagement in side-by-side relationship with a line, said primary element being formed from at least one open helical wire of resilient material having a pitch such that it may be applied to a line from the side of the line without permanent deformation, said wire being bent intermediate its ends to provide a bight portion for circumferential engagement with a support and having a crossover point from which extend leg portions for wrapping engagement around the line and the resilient portions of said secondary element, said secondary element engaged with the bight portion of said primary element at its apex.

2. An article as described in claim 1, wherein said secondary element is disposed within the helix of said bight at the apex and said resilient portions extend out of the helix on opposite sides spaced from said apex.

3. An article as described in claim 2, wherein the central portion of said secondary element has an enlarged diameter engaged in the apex of said bight.

4. An article as described in claim 2, wherein said secondary element is comprised of a piece of strand.

5. An article as described in claim 3, wherein said enlarged diameter is formed by an overlay of helical rods wrapped around the mid-portion of the secondary element.

6. An article as described in claim 1 in combination with a line and a support means for holding the line on the support, wherein said primary element has the bight portion disposed in surrounding engagement with the support, the secondary element has the resilient portions extending alongside said line, said primary element having its leg portions wrapped around the line adjacent the support and around the line and said flexible portions of the secondary element holding the secondary element to the line.

7. The combination as described in claim 6, wherein said secondary element is of enlarged diameter at the points where it extends through the bight.

8. The combination as described in claim 6, wherein said secondary element is a piece of strand.

9. The combination as described in claim 6, wherein the bight engaging portion of the secondary element is enlarged by a plurality of armor rods.

References Cited

UNITED STATES PATENTS 2,761,273   9/1956   Peterson.
2,947,504   8/1960   Ruhlman _____ 174—173 X
2,959,632   11/1960  Peterson _____ 174—42 X

OTHER REFERENCES

Karl: German Printed Application No. R 16796, published May 30, 1956.

LARAMIE E. ASKIN, *Primary Examiner.*